United States Patent [19]

Carelli

[11] Patent Number: 4,584,167

[45] Date of Patent: Apr. 22, 1986

[54] BLANKET MANAGEMENT METHOD FOR LIQUID METAL FAST BREEDER REACTORS

[75] Inventor: Mario D. Carelli, Greensburg, Pa.

[73] Assignee: Westinghouse Electric Corp., Pittsburgh, Pa.

[21] Appl. No.: 618,769

[22] Filed: Jun. 11, 1984

Related U.S. Application Data

[63] Continuation of Ser. No. 371,332, Apr. 23, 1982, abandoned.

[51] Int. Cl.⁴ .............................................. G21C 19/00
[52] U.S. Cl. .................................... 376/267; 376/172; 376/173
[58] Field of Search .......................... 376/172, 173, 267

[56] References Cited

U.S. PATENT DOCUMENTS

| | | | |
|---|---|---|---|
| 3,158,543 | 11/1964 | Sherman et al. | 376/267 |
| 3,228,846 | 1/1966 | Bryan . | |
| 3,335,061 | 8/1967 | Winsche et al. | 376/267 X |
| 3,575,803 | 4/1971 | Greebler . | |
| 3,591,453 | 7/1971 | Gratton . | |
| 3,658,643 | 4/1972 | Spenke . | |
| 3,892,625 | 7/1975 | Patterson | 376/267 X |
| 3,986,924 | 10/1976 | Motoda | 376/267 X |
| 4,040,902 | 8/1977 | Mysels | 376/267 |
| 4,050,986 | 9/1977 | Ference et al. . | |

FOREIGN PATENT DOCUMENTS

| | | | |
|---|---|---|---|
| 2815200 | 11/1978 | Fed. Rep. of Germany | 376/267 |
| 1209632 | 10/1970 | United Kingdom . | |

OTHER PUBLICATIONS

Dickson, "CRBR Nuclear Thermofluid and Advanced Fuel Design," pp. 63-70, Apr. 1975, PMC-75-02, Conf-741087.
Baxi et al., "Gas-Cooled Reactor Blanket Management Considerations," p. 224, Transactions of the American Nuclear Society, 1976 Inter Meeting, 1976.
Nero, "Nuclear Reactors," pp. 203-214, University of Calif. Press, 1979.
"Possible Fuel Utilization Schemes," pp. 136-139, Nucl. Energy 1981, vol. 20, Apr., No. 2.
Tzanos, "Reduction of Power Distribution Sensitivity in Heterogeneous LMFBRs," *ANS Trans*, vol. 27, 11/77, pp. 900-903.

*Primary Examiner*—Deborah L. Kyle
*Assistant Examiner*—Richard W. Wendtland
*Attorney, Agent, or Firm*—W. D. Palmer

[57] ABSTRACT

A method for reducing thermal striping in liquid metal fast breeder reactors by reducing temperature gradients between adjacent fuel and blanket assemblies by shuffling blanket assemblies at each refueling outage so as to progressively shuffle the blanket assemblies to the core periphery through multiple moves and to generally locate fresh blanket assemblies adjacent to exposed fuel assemblies and exposed blanket assemblies adjacent to fresh fuel. Additionally, assembly orificing is altered to provide less flow to blanket assemblies needing less flow due to an otherwise decreased temperature gradient and providing additional flow to fuel assemblies which need more flow to sufficiently reduce temperature gradients to prevent thermal striping.

15 Claims, 8 Drawing Figures

SEQUENCE A

LEGEND

F FRESH
B BURNT
S SHUFFLED
/ NOT "OUT OF SYNC" INTERFACE

BLACK HEAVY BORDER → BLANKET ASSEMBLY

⬡ EXTRA FLOW NEEDED

BLANKET MANAGEMENT METHOD FOR LIQUID METAL FAST BREEDER REACTORS

This application is a continuation of application Ser. No. 371,332, filed Apr. 23, 1982 now abandoned.

BACKGROUND OF THE INVENTION

This invention relates to a blanket shuffling method for a liquid metal fast breeder reactor (LMFBR).

LMFBR's, especially the heterogeneous core variety, have a design problem, explained below, which is termed "thermal striping". The basic source of this problem is the inherent difference between the power generation in fuel and blanket assemblies in a heterogeneous LMFBR core. A heterogeneous core is a core having a plurality of fuel and blanket zones interspersed throughout the core causing a multitude of blanket to fuel interfaces. The power generated in a fertile material fueled blanket assembly increases continuously with the breeding of fissile fuel, while the power generated in a fissile material containing fuel assembly decreases continuously during burnup. During its lifetime, a blanket assembly increases its power output by a factor of 2 to 5 before it reaches its design limits and must be removed from the reactor and replaced. The coolant flow rate through a blanket assembly is controlled by a fixed inlet orifice, the design of which is dictated by those limits which are approached at the end of life. Thus, a blanket assembly is overcooled over most of its lifetime, which for internal blanket assemblies in a heterogeneous core, is on the order of 2 to 3 years (same as fuel assembly lifetime). However, the overcooling in radial blanket assemblies is even more pronounced because of longer lifetimes (4 to 5 years) and higher power gradients across the assembly. That is, the coolant flow rate is set by the rod with the maximum power which may be as much as 5 times higher than that in the minimum power rod.

The effect of blanket overcooling is that at beginning of life, the coolant from a blanket assembly may be as much as 350° F. cooler than that from an adjacent fuel assembly. If this "maximum potential" temperature difference were completely mitigated by coolant mixing, conduction and entrainment, there would be no thermal striping problem. However, flow testing of reactor models has demonstrated that large differences in assembly outlet temperatures result in hot and cold coolant streams impinging on surrounding structures. Temperature differences from 30 to 60 percent of the maximum potential were observed in flow patterns away from the outlet nozzles, in the Upper Internals Structure (UIS) and as much as 60 to 80 percent of the maximum potential was observed near assembly outlet nozzles. When the hot and cold flow streams impinge upon adjacent structures, thermal stresses, due to differential thermal expansion, are induced in these structures. If the stresses exceed the fatigue strength of the material, crack initiation and, if stresses are severe enough, crack propagation can occur. This is the problem called "thermal striping". For Type 316 stainless steel the limits on maximum fluid temperature difference are 80–120° F. for permanent structures and 120–160° F. for replaceable structures. As can be seen, large temperature differences on the order of 350° F. violate these limits even with partial mitigation by mixing and conduction. Inconel 718 can be used to solve the problem because its design limits are approximately twice those for type 316 stainless steel, but its cost is higher. Thermal striping problems are especially severe in heterogeneous cores because of the high number of blanket fuel interfaces where the temperature differences occur. Consequently, it is desired to provide a method to mitigate thermal striping to such a degree that 316 stainless steel can be used for replaceable and permanent reactor structures, in an LMFBR having fuel and blanket regions comprising a heterogeneous core.

SUMMARY OF THE INVENTION

A new fuel and blanket management and core orificing method has been developed for large LMFBR heterogeneous cores. The method comprises multiple shuffling of blanket assemblies into other blanket assembly positions throughout the core with a controlled residence time in each position. In general, the shuffling trend is from an inner core blanket region to outer core radial blanket positions.

DETAILED DESCRIPTION

The invention is a blanket shuffling scheme which greatly reduces the temperature gradients between blanket assemblies and adjacent fuel assemblies. The method described herein reduces maximum gradients by 150° F. or more, mitigating thermal striping to the point where the use of Inconel for core components is unnecessary.

The size of the temperature gradient between a fuel assembly and an adjacent blanket assembly can be reduced by increasing the outlet temperature of the coolant exiting from the blanket assembly (since the coolant flow exiting from the fuel is always hotter than that from blanket assemblies). Such blanket outlet temperature increase can be achieved by reducing coolant flow through the blanket assembly or by increasing blanket assembly power. The basic invention is to shuffle blanket assemblies between core locations having fixed orifices which therefore appropriately alter coolant flow through the blanket assembly while also arranging that radiation exposed blanket assemblies, which are higher power producing than fresh assemblies due to the build-up of fissile elements, are located adjacent to fuel assemblies of high power. In general terms, fresh blanket assemblies are to be adjacent to exposed or "used" fuel assemblies while used blanket assemblies are to be adjacent to fresh fuel assemblies.

The invented blanket shuffle will be illustrated by a specific application.

Figure 1:
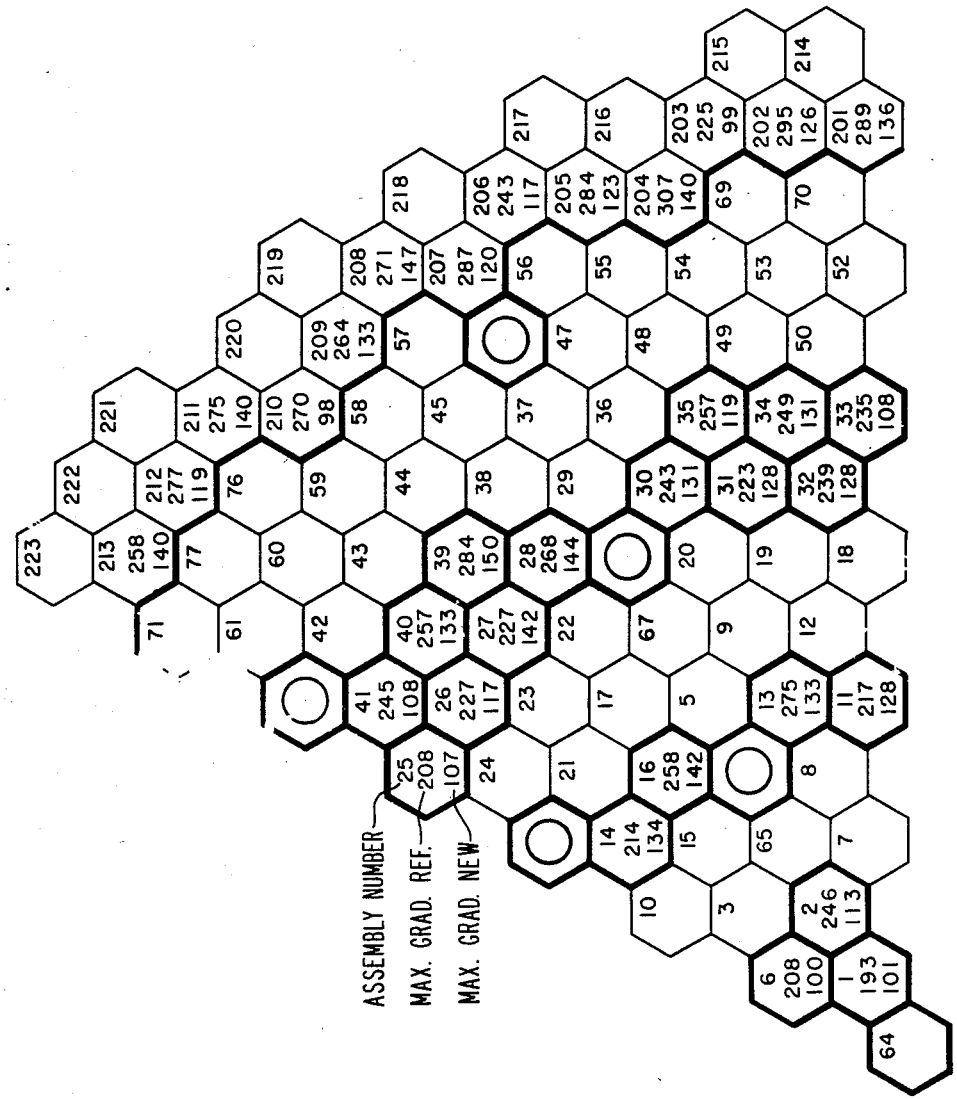
FIG. 1 is a plan schematic of an LMFBR core (core I), showing the gradient reduction capability of this invention.

The reference core used for this shuffling description is a heterogeneous oxide core with thorium blanket capability. This core features scattered refueling, three-year residence fuel assemblies, three-year residence inner blanket assemblies, (except positions in the sixth row labeled 11, 13, 14 and 16 which have a two year lifetime), and six-year residence radial blanket assemblies. This core was selected because a very detailed orificing and thermal-hydraulic analysis existed for use as an analysis base. The assembly number, and maximum assembly-to-assembly temperature gradients for this reference and for the invented shuffle scheme are shown in FIG. 1, which is illustrative of only a 60° portion of the otherwise symmetric core.

Figure 2:
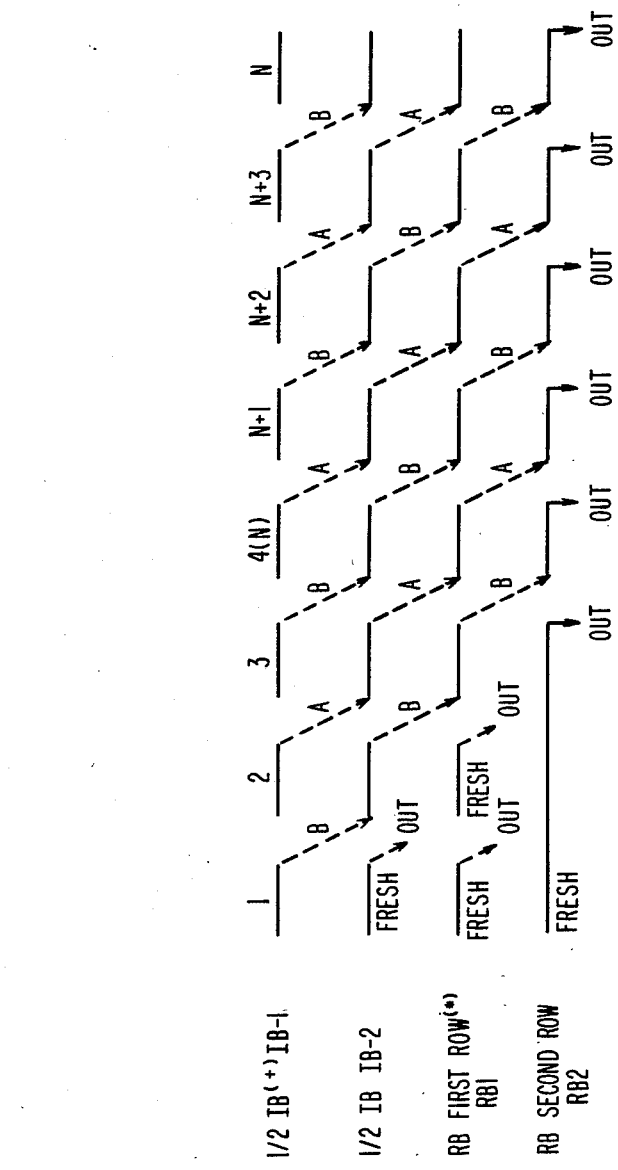
FIG. 2 is a schematic of the blanket shuffling method.

The invented blanket management scheme is shown in FIG. 2. One-half (60) of the Inner Blanket (IB-1) assemblies are shuffled after one year (N) to another Inner Blanket Position, (IB-2) where they reside in the second year (equilibrium year N+1, where N is the year the assemblies are fresh), then they spend their third year (N+2) in the radial blanket first row, and the final year (N+3) in the radial blanket second row. At the end of the fourth year, they are discarded. The remaining one-half of the inner blanket follows the same steps, staggered by one year. Thus, there are two sequences, called A and B, which completely represent the blanket assembly shuffling. A few assemblies do not participate in the shuffling; they are the inner blanket assembly at the core center and 18 first row radial blanket assemblies. In the case of the central assembly, since this is the only assembly of its type in the reactor, obviously it cannot be shuffled to any other position because of symmetry. This assembly has low power, low flow, and is flanked by other inner blanket assemblies. It can be left in place until limiting constraints are reached. The reason 18 radial blanket assemblies do not participate is simply that in this particular core, there are 78 radial blanket first row positions available, while only 60 inner blanket assemblies are shuffled to the radial blanket first row on a yearly basis. Unless a very complicated shuffling scheme is devised, the most obvious choice is to simply replace assemblies in these 18 positions at regular intervals.

Table 1 shows the moves of the various assemblies being shuffled. In selecting the shuffling of a given assembly from one position to another, care was exercised with respect to the implicit exclusions built in the two sequences. For example, "donor" inner blanket assemblies in sequence A, must be "receiving" assemblies in sequence B and vice versa. Likewise, radial blanket positions must accept one sequence A and one sequence B assembly, not two from the same sequence.

TABLE 1

Summary of Blanket Assemblies Shuffling Moves

| Year | IB-1 → N (fresh) | IB-2 → N + 1 | RB1 → N + 2 | RB2 → N + 3 | Discarded N |
|---|---|---|---|---|---|
| Sequence A (all assemblies belonging to this sequence are moved the same year) | | | | | |
| | 35 | 39 | 212 | 217 | |
| | 6 | 13 | 209 | 222 | |
| | 1 | 16 | 213 | 221 | |
| | 27 | 34 | 211 | 220 | |
| | 14 | 41 | 202 | 216 | |
| | 28 | 32 | 210 | 214 | |
| | 33 | 26 | 201 | 215 | |

TABLE 1-continued

Summary of Blanket Assemblies Shuffling Moves

| Year | IB-1 → N (fresh) | IB-2 → N + 1 | RB1 → N + 2 | RB2 → N + 3 | Discarded N |
|---|---|---|---|---|---|
| | 40 | 31 | 205 | 223 | |
| | 2 | 11 | 204 | 219 | |
| | 30 | 25 | 207 | 218 | |
| Sequence B (all assemblies belonging to this sequence are moved the same year, which is the preceding and following year to moves of sequence A) | | | | | |
| | 25 | 28 | 204 | 218 | |
| | 41 | 40 | 205 | 215 | |
| | 16 | 35 | 212 | 222 | |
| | 34 | 2 | 209 | 221 | |
| | 13 | 30 | 211 | 217 | |
| | 39 | 33 | 207 | 214 | |
| | 11 | 27 | 202 | 216 | |
| | 32 | 14 | 201 | 219 | |
| | 26 | 6 | 210 | 223 | |
| | 31 | 1 | 213 | 220 | |

Notes:
IB #64 is never moved. Leave in position as long as compatible with constraints, then discard.
RB1 #203, 206 and 208 are "one-year" assemblies, loaded and discarded every year.

Flow orificing is of course fixed in the core position, with all the blanket assemblies being physically identical to allow shuffling. The philosophy followed in defining the flow allocation was to design the flow as much as possible compatible with continued satisfaction of flow constraints on blanket lifetime and transient accommodation. The specific details as to how this was achieved varied depending upon whether the considered location was in the inner blanket, radial blanket first row or radial blanket second row. Generally, a good indication of the new flow requirements was given by the ratio of the peak rod linear power rating at the end of the residence time for the shuffled core to the power rating at end of life for the reference core. An estimate of the change in the peak rod linear power rating following shuffling is obtained using simple algorithms. Basically, when assembly Y is shuffled to position Z, the fraction of power generated by neutron fission depends on Y, the assembly being shuffled (since it is related to the amount of fissile material in the assembly). The power fraction due to gamma heating depends on the environment, i.e., the location Z to which the assembly is shuffled. It is further assumed that the relative power change during one year residence after shuffling in a given location is equal to the relative change during a corresponding year in the lifetime of the assembly in the reference core location. The peak rod (and in some instances total assembly) power histories for all possible shuffling combinations were calculated in this study. This allowed the optimum shuffling sequence to be determined for each assembly.

In calculating the new flow requirements for each location following shuffling, the parameter used was the required flow (minimum flow necessary to satisfy the most limiting constraint) for each location. This is important because while the orificed flow is the same for all assemblies in a given orificing zone, the required flow is the same as the orificed flow for only one worst assembly. All the other assemblies in the orifice zone have an orificed flow greater than the required flow. Since the required flow following shuffling is equal to the reference core required flow multiplied by a power depending flow factor (i.e. dependent upon which assembly is shuffled into what location), it follows that the designer had an additional degree of freedom in optimizing the orificing. However, the choice of the assembly to be shuffled was somewhat tempered by the constraint of minimizing the gradient. Through judicious selection of the shuffling moves and exploitation of the differences between required and orificed flow in the reference core, it was possible to optimize the orificing such that the variation between required and orificed flow was substantially lower than for the reference core. This resulted in both flow savings and lower temperature gradients, since an orificed flow higher than the required flow not only is flow "wasted" but also yields a lower coolant exit temperature from the blanket assembly.

A comparison of the flow orificing in the shuffled and the reference core is reported in Table 2. The flow is significantly reduced in the inner blanket and radial blanket first row and is increased in the radial blanket second row to follow cladding damage accumulation in shuffled assemblies. It is believed that the flow estimate for the radial blanket second row is pessimistic (i.e., lifetime of these assemblies could be achieved with less flow than now estimated). In fact, the highest degree of uncertainty exists in the second row since this is the last of the three moves and all the approximations and assumptions inherent in this study finally accumulate to a maximum in the last year. However, it must be emphasized that any uncertainty on the flow in the second row of radial blankets does not affect the conclusions of this study. This is because inter-assembly gradients are of no concern in this region and the only consequence will be an adjustment in the flow required.

be safely concluded that blanket shuffling indeed has the potential to reduce inter-assembly gradients by one half. The highest gradient between adjacent fuel and blanket assemblies occurs when both the fuel and the blanket are fresh (fuel at highest power, blanket at lowest); the lowest gradient occurs when both assemblies are at end of life (fuel power minimum by depletion effects, blanket power maximum by plutonium generation). It follows that a very efficient method to assure low inter-assembly gradients is to locate fresh fuel assemblies next to burnt (shuffled) blanket assemblies and vice versa. This requires that fuel and inner blanket assemblies have the same lifetime as well as an "out of synchronization" fuel management scheme. Gradients at the fuel/inner blanket interface reported in this study used this new/old configuration, (i.e., gradients calculated were for fresh fuel/shuffled blanket and burnt fuel/fresh blanket). The higher of the two gradients (generally the first one) was consistently reported in FIG. 1. It has been seen before that by shuffling, in this scheme, one-half of the inner blanket assemblies each year, the blanket assemblies which are fresh are limited each year to those replacing the shuffled assemblies, i.e., one-half of the inner blanket. The positions of the fresh inner blanket assemblies alternate every other year. Flow cannot be reduced in the fresh assemblies, since the position orificing is dictated by the cooling requirement of the assembly being shuffled in the second year. The solution therefore to the high gradient which will occur between adjacent fuel and blanket assemblies

TABLE 2

| | | Orificing Requirements for Reference and "Shuffled" Core | | | |
|---|---|---|---|---|---|
| | | Reference Core | | Shuffled Core | |
| Assembly Type | Orificing Zone | # Assys/Zone | Flow (lb/hr) | # Assys/Zone | Flow (lb/hr) |
| IB | 6 | 36 | 156,200 | 24 | 121,000 |
| IB | 7 | 24 | 129,600 | 36 | 104,000 |
| IB | 8 | 54 | 112,700 | 54 | 85,000 |
| IB | 9 | 7 | 41,000 | 7 | 42,000 |
| Partial Total | | | 15,106,400 | | 11,022,000 |
| RB1 | 10 | 18 | 138,800 | 18 | 93,700 |
| RB1 | 11 | 36 | 85,200 | 42 | 66,600 |
| RB1 | 12 | 24 | 59,300 | 18 | 23,400 |
| Partial Total | | | 6,988,800 | | 4,905,000 |
| RB2 | 13 | 60 | 27,500 | 30 | 59,400 |
| RB2 | 14 | — | — | 30 | 49,000 |
| Partial Total | | | 1,650,000 | | 3,252,000 |
| Total Blanket Flow | | | 23,745,200 | | 19,179,000 |

As indicated by Table 2, there is a substantial net gain projected in blanket assembly flow (over $4.5 \times 10^6$ lb/hr or ~4.5% of the total reactor flow). The gain is more than enough to offset any "surprises" which may occur when moving from a conceptual to an actual design. Also this available flow could allow preferential flow allocation to the fuel assemblies, which could reduce the interassembly gradients even below the levels estimated herein.

Figure 3:
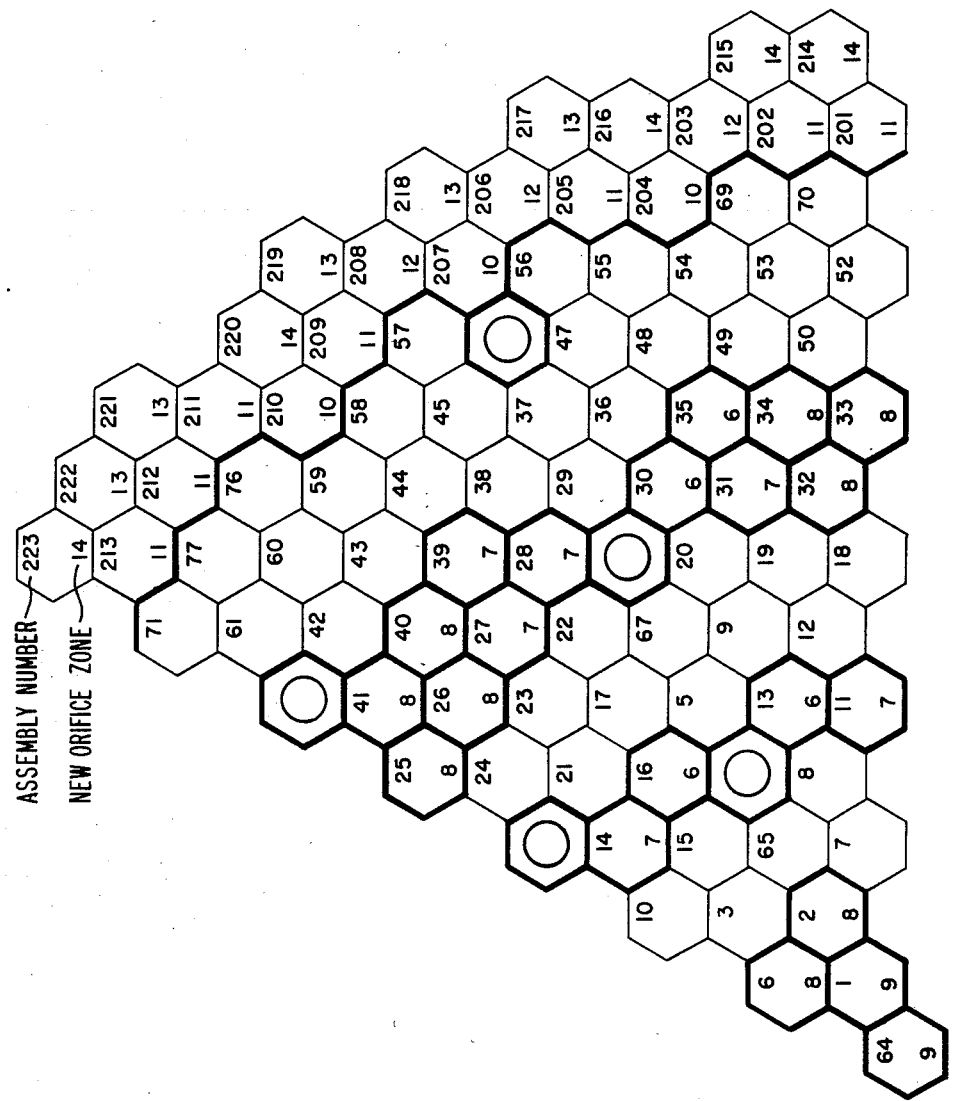
FIG. 3 is a plan schematic of an LMFBR core I, illustrating orificing zones arrangement.

FIG. 3 shows the new orificing zones for the shuffled cores. A comparison of the distribution of maximum inter-assembly gradients in the reference and shuffled cores was reported earlier in FIG. 1. For each inner blanket and radial blanket first row assembly the maximum gradient is the difference between the blanket exit temperature and the highest exit temperature of the adjacent fuel assemblies. As it can be seen, the maximum gradient in the inner blanket is reduced from 284° F. to 150° F. and in the radial blanket first row from 307° F. to 147° F. Even allowing for inevitable uncertainties associated with the assumptions used in this study (but keeping in mind that extra flow exists) it can when both are fresh is through appropriate fuel management. Since the exit temperature of the fuel assemblies is maximum at beginning-of-life and minimum at end-of-life, while the opposite is true for the blanket assemblies, it is clear that significant reduction in inter-assembly gradient is attained when a fresh fuel is next to a shuffled blanket (both at their higher temperature) and when a burnt fuel is next to a fresh blanket (both at their lower temperature). In order to achieve this, fuel and inner blanket must have the same lifetime (2 years in this example) and the core configuration must be such that fuel and blanket residence times are indeed out of synchronism. The scheme elaborated in this invention, by shuffling one-half of the inner blanket each year, requires that one-half of the fuel assemblies also be loaded each year.

Figure 4:
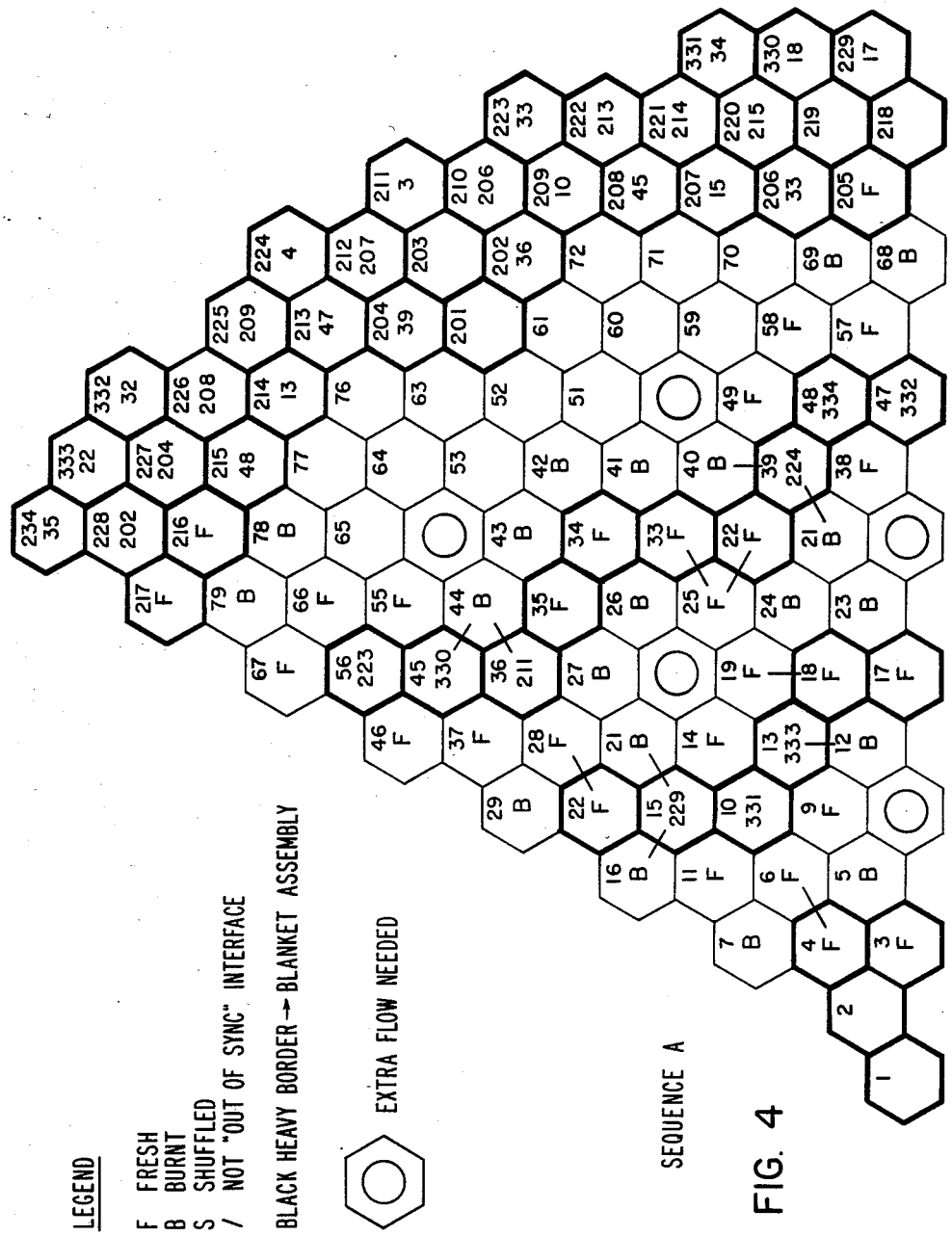
FIG. 4 is a plan schematic of another LMFBR core (core II) illustrating sequence A of a first alternate blanket shuffling method.
Figure 5:
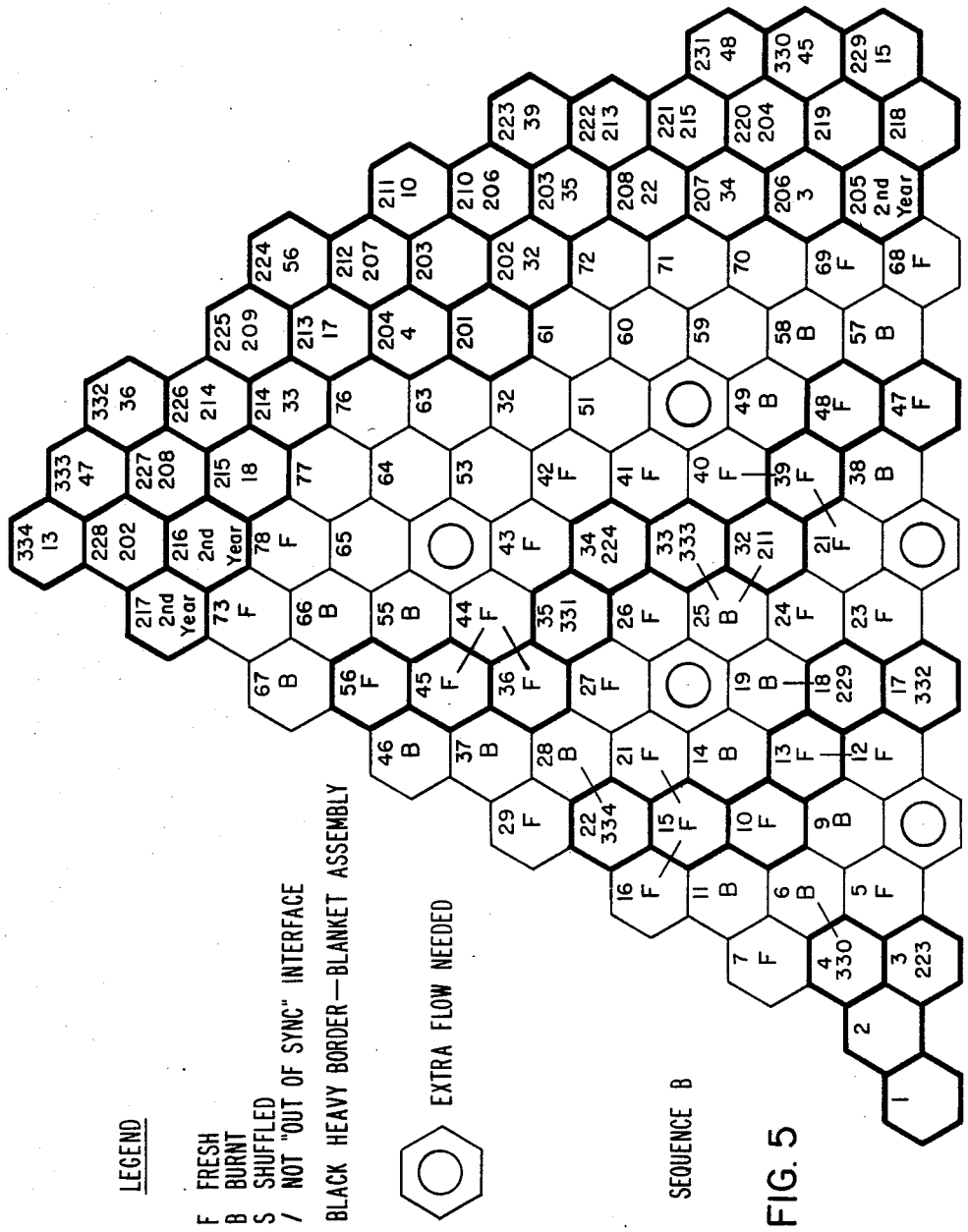
FIG. 5 is a plan schematic of LMFBR core II illustrating sequence B of a first alternate blanket shuffling method.
Figure 6:
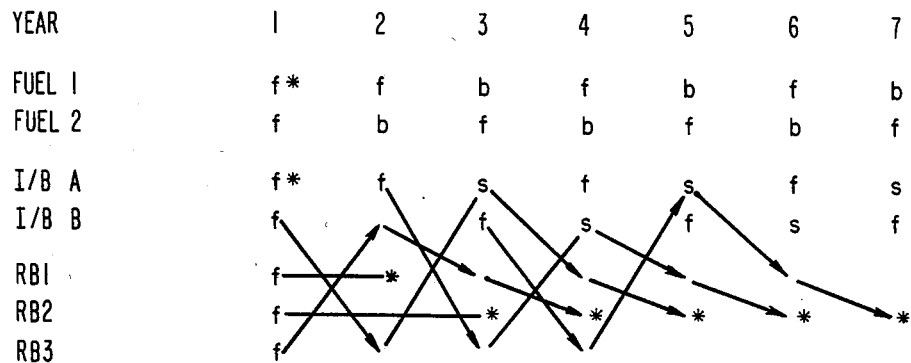
FIG. 6 is a schematic of the first alternate shuffling method.

Complete implementation of the "out of sync" loading of fuel and blanket assemblies may not be advisable, since this will effectively decouple (in a nuclear physics sense) the central part of the core with consequent excessive linear power rating in the fuel assemblies, when fresh. However, a first alternate assembly management scheme can be devised in which the fuel limiting power ratings are not exceeded and the number of interfaces where the "out-of-sync" arrangement does not hold is limited to only a few positions. FIGS. 4, 5, and 6 report such a scheme for a proposed core configuration currently studied (different from the one considered in the previous conceptual study). As shown by FIGS. 4 and 5, the not "out-of-sync" interfaces are only 12 out of a possible total of 65. The gradients in these locations will be controlled by allocation of part of the existing excess flow to the affected fuel assemblies. Note that in order to provide the "out-of-sync" arrangement, inner blanket assemblies are moved to the radial blanket third row and subsequently in the third year to the shuffled position in the inner blanket (see Table 3). This "third row packing" has the effect of shifting by one year the loading sequences in the fuel and inner blanket, thus providing the "out-of-sync" effect.

Figure 8:
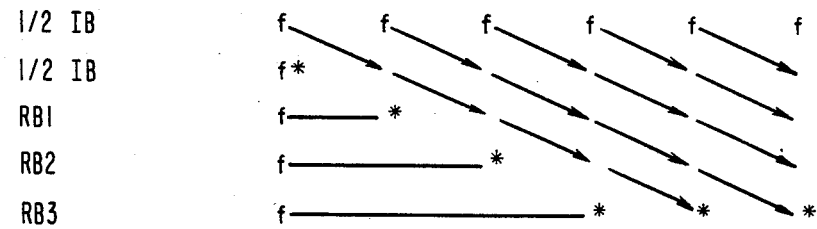
FIG. 8 is a schematic of the second alternate shuffling method.

A second alternate shuffling scheme is proposed, (see FIGS. 7, 8) in which the "out-of-sync" concept is replaced by maximization of the flow reduction in all the inner blanket assemblies. In the first alternate scheme each inner blanket position will alternatively host a fresh and a shuffled assembly (sequences "A" and "B"); therefore, at the beginning of the year when the assembly is fresh the assembly outlet temerature is minimum, since the power production is at its lowest while the flow is allocated to accommodate the (maximum) power production at the end of the second year in the shuffled assembly. Of course, the gradient in this scheme is controlled through the "out-of-sync" concept.

Figure 7:
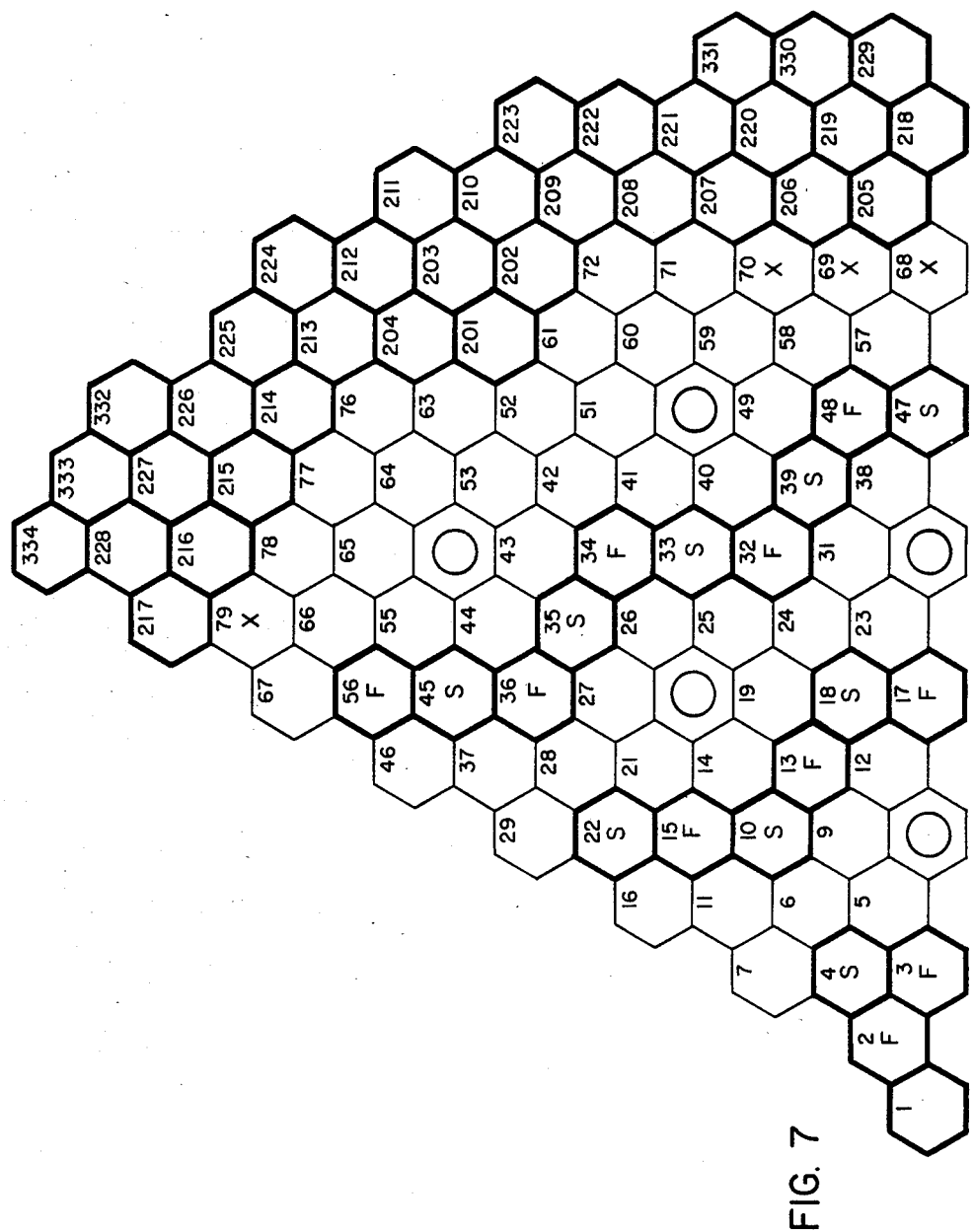
FIG. 7 is a plan schematic of LMFBR core II illustrating a second alternate blanket shuffling scheme.

In the second alternate scheme, instead, the gradient is controlled through flow management of the inner blanket assemblies. Each inner blanket position will accept at every year (refueling interval) either a fresh or a shuffled assembly; therefore the power swing from beginning to end of life of the assembly in any position is limited to one year instead of two years as in the first alternate scheme. The flow allocation will be tailored, depending whether the position accepts fresh or shuffled assemblies, being significantly lower in the former case. FIG. 7 shows the inner blanket assemblies arrangement for this scheme. After the second year the assemblies are successively shuffled to the radial blanket first, second and third row where they reside for one year in each position, for a total lifetime of 5 years. The characteristic feature of this scheme is that fresh and shuffled inner blanket assemblies alternate as "necklace beads", as shown in FIG. 7; fuel loading can be separately optimized to minimize linear power rating and thus increase the margin to fuel melting.

Tables 3 and 4 illustrate first and second alternate shuffling schemes.

TABLE 3

SHUFFLING SEQUENCE - FIRST ALTERNATE

| Sequence A - Starts Years 2,4,6 ... | | | | |
|---|---|---|---|---|
| Years 2,4,6 ... IB Fresh | Years 3,5,7 ... RB3 | Years 4,6,8 ... IB | Years 5,7,9 ... RB1 | Years 6,8,10 ... RB2 |
| 3 | 211 | 36 | 202 | 228 |
| 4 | 224 | 39 | 204 | 227 |
| 17 | 229 | 15 | 207 | 212 |
| 22 | 333 | 13 | 214 | 221 |
| 18 | 330 | 45 | 208 | 226 |
| 34 | 331 | 10 | 209 | 225 |
| 32 | 332 | 47 | 213 | 222 |
| 33 | 223 | 56 | 206 | 210 |
| 35 | 334 | 48 | 215 | 220 |

| Sequence B - Starts Years 1,3,5 ... | | | | |
|---|---|---|---|---|
| Years 1,3,5 ... IB Fresh | Years 2,4,6 ... RB3 | Years 3,5,7 ... IB | Years 4,6,8 ... RB1 | Years 5,7,9 ... RB2 |
| 10 | 211 | 32 | 202 | 228 |
| 47 | 333 | 33 | 214 | 226 |
| 13 | 334 | 22 | 208 | 227 |
| 15 | 229 | 18 | 215 | 221 |
| 45 | 330 | 4 | 204 | 220 |
| 56 | 224 | 34 | 207 | 212 |
| 48 | 331 | 35 | 209 | 225 |
| 36 | 332 | 17 | 213 | 222 |
| 39 | 223 | 3 | 206 | 210 |

RBI 205 stays 2 years - moved to RB2 203 for 2 more years, then out
RBI 216 stays 2 years - moved to RB2 213 for 2 more years, then out
RBI 217 stays 2 years - moved to RB2 218 for 2 more years, then out

TABLE 4

SECOND ALTERNATE
FLOW MANAGEMENT SHUFFLING SEQUENCES
IB positions refueled fresh every year:
2,3,15,13,17,56,36,34,32,48

| Shuffling Sequence | | | | |
|---|---|---|---|---|
| IB Fresh | 2nd Year IB | 3rd Year RB1 | 4th Year RB2 | 5th Year RB3 |
| 2 | 45 | 216 | 220 | 211 |
| 3 | 35 | 202 | 212 | 223 |
| 15 | 47 | 208 | 203 | 229 |
| 13 | 22 | 207 | 226 | 334 |
| 17 | 10 | 214 | 222 | 331 |
| 56 | 39 | 215 | 221 | 333 |
| **36 | 4 | 213 | | |
| *34 | 201 (RB1) | 210 (RB2) | 224 (RB3) | |
| 32 | 18 | 209 | 225 | 332 |
| 48 | 33 | 204 | 228 | 330 |

*shorter sequence (4 yrs.) IB directly moved to RB1
**only 3 years sequence, from 213 out
***RB1 205 stays two yrs - moved to RB2 227 for two more yrs then out
***RB1 206 stays two yrs - moved to RB2 218 for two more yrs then out
***RB1 217 stays two yrs - moved to RB2 219 for two more yrs then out

I claim:

1. The method of moving blanket assemblies during refueling in a heterogeneous-type core for a liquid-metal-cooled fast-breeder nuclear reactor to improve the performance thereof, said core comprising a plurality of fissile-material-containing fuel assemblies and a plurality of fertile-material-containing blanket assemblies, said blanket assemblies including a plurality of inner blanket assemblies positioned in predetermined different locations within the interior of said core and radial blanket assemblies positioned proximate the periphery of said core, said inner blanket assemblies located proximate the center of said core and also positioned to form a plurality of separate blanket assembly rows which are radially spaced from one another and also from said radial blanket assemblies and are generally concentric with respect to the center of said core, said radial blanket assemblies comprising inner and outer contiguous rows of individual blanket assemblies positioned proximate the periphery of said core, said fuel assemblies comprising a plurality of separate fuel assembly rows positioned intermediate said spaced blanket assembly rows, and said reactor being periodically refueled at the termination of predetermined periods of reactor operation, said method comprising moving said blanket assemblies in accordance with the following schedule:

prior to blanket assembly movement during refueling, approximately one-half of said inner blanket assemblies having been operated as inner blanket assemblies for one of said predetermined periods of reactor operation and approximately one-half of said inner blanket assemblies having been operated as inner blanket assemblies for two of said predetermined periods of reactor operation, and during refueling performing the following operations:

replacing approximately one-half of all of said inner blanket assemblies with fresh blanket assemblies;

moving blanket assemblies which have been operated as inner blanket assemblies for one of said predetermined periods of reactor operation to replace substantially all of those of said inner blanket assemblies which are not replaced with fresh blanket assemblies;

moving substantially all of said inner blanket assemblies which have been operated as inner blanket assemblies for two of said predetermined periods of reactor operation to replace blanket assemblies in said inner radial blanket assembly row;

moving substantially all of said blanket assemblies which are replaced from said inner radial blanket assembly row to replace blanket assemblies in said outer radial blanket assembly row; and repeating the foregoing blanket assembly movements in subsequent refuelings, whereby the substantial majority of said blanket assemblies are initially operated in inner blanket assembly positions for one of said predetermined periods of reactor operation and are subsequently operated in different inner blanket assembly positions for an additional one of said predetermined periods of reactor operation after which they are operated in inner radial blanket assembly positions for one of said predetermined periods of reactor operation after which they are operated in outer radial blanket assembly positions for one of said predetermined periods of reactor operation.

2. The method as specified in claim 1, wherein prior to refueling, approximately one-half of said fuel assemblies have been operated for one of said predetermined periods of reactor operation and approximately one-half of said fuel assemblies have been operated for two of said predetermined periods of reactor operation, and during each said refueling fresh fuel assemblies are moved to replace those of said fuel assemblies which have been operated for two of said predetermined periods of reactor operation with substantially all of said fresh fuel assemblies positioned proximate those of said inner blanket assemblies which have been operated for one of said predetermined periods of reactor operation to minimize the temperature gradients therebetween, and substantially all of said fuel assemblies which have been operated for one of said predetermined periods of reactor operation and are not replaced being positioned proximate said fresh inner blanket assemblies to minimize the temperature gradients therebetween.

3. The method as specified in claim 2, wherein during each said refueling said replaced fuel assemblies are removed from said core.

4. The method as specified in claim 1, wherein said reactor core includes an additional contiguous blanket assembly row positioned partially about said outer radial blanket assembly row, during each said refueling inner blanket assemblies which have been operated as inner blanket assemblies for one of said predetermined periods of reactor operation are moved to replace blanket assemblies in said additional contiguous blanket assembly row, and blanket assemblies which are replaced from said additional contiguous blanket assembly row are moved to replace substantially all said inner blanket assemblies which are not replaced with fresh blanket assemblies.

5. The method as specified in claim 4, wherein during each said refueling said replaced outer radial blanket assemblies are removed from said core.

6. The method as specified in claim 5, wherein prior to refueling, approximately one-half of said fuel assemblies have been operated for one of said predetermined periods of reactor operation and approximately one-half of said fuel assemblies have been operated for two of said predetermined periods of reactor operation, and during each said refueling fresh fuel assemblies are moved to replace those of said fuel assemblies which have been operated for two of said predetermined periods of reactor operation with substantially all of said fresh fuel assemblies positioned proximate those of said inner blanket assemblies which have been operated for one of said predetermined periods of reactor operation to minimize the temperature gradients therebetween, and substantially all of said fuel assemblies which have been operated for one of said predetermined periods of reactor operation and are not replaced being positioned proximate said fresh inner blanket assemblies to minimize the temperature gradients therebetween.

7. The method as specified in claim 4, wherein during each said refueling said replaced fuel assemblies are removed from said core.

8. The method as specified in claim 1, wherein said reactor core includes an additional contiguous blanket assembly row positioned partially about said outer radial blanket assembly row, during each said refueling said fresh blanket assemblies replace substantially all of said inner blanket assemblies which have been operated for one of said predetermined periods of reactor operation, substantially all of said inner blanket assemblies which are replaced with fresh blanket assemblies are moved to replace substantially all of said inner blanket assemblies which have been operated as inner blanket assemblies for two of said predetermined periods of reactor operation, and said replaced blanket assemblies in said outer radial blanket assembly row are used to replace blanket assemblies in said additional contiguous blanket assembly row.

9. The method as specified in claim 8, wherein substantially all of said inner blanket assemblies are alternately positioned so that at the termination of each of said predetermined periods of reactor operation and prior to refueling, an inner blanket assembly which has been operated for one of said predetermined periods of reactor operation is positioned next to an inner blanket assembly which has been operated for two of said predetermined periods of reactor operation.

10. The method as specified in claim 9, wherein each of said inner blanket assemblies has a predetermined rate of flow of cooling fluid therethrough during reactor operation, and those of said inner blanket assembly positions which are adapted to receive fresh blanket assemblies during refueling having a predetermined lesser rate of flow of cooling fluid therethrough than those of said inner blanket assembly positions which are adapted to receive blanket assemblies during refueling which have already been operated for one of said predetermined periods of reactor operation.

11. The method as specified in claim 10, wherein during each said refueling those blanket assemblies which are replaced in said additional contiguous blanket assembly row are removed from said core.

12. The method of moving blanket assemblies during refueling in a heterogeneous-type core for a liquid-metal-cooled fast-breeder nuclear reactor to improve the performance thereof, said core comprising a plurality of fissile-material-containing fuel assemblies and a plurality of fertile-material-containing blanket assemblies, said blanket assemblies including a plurality of inner blanket assemblies positioned in predetermined different locations within the interior of said core and radial blanket assemblies positioned proximate the periphery of said core, said inner blanket assemblies located proximate the center of said core and also positioned to form a plurality of separate blanket assembly rows which are radially spaced from one another and also from said radial blanket assemblies and are generally concentric with respect to the center of said core, said radial blanket assemblies comprising inner and outer contiguous rows of individual blanket assemblies positioned proximate the periphery of said core, and additional contiguous blanket assembly row positioned partially about said outer radial blanket assembly row, said fuel assemblies comprising a plurality of separate fuel assembly rows positioned intermediate said spaced blanket assembly rows, and said reactor being periodically refueled at the termination of predetermined periods of reactor operation, said method comprising moving said blanket assemblies in accordance with the following schedule:

prior to blanket assembly movement during refueling, approximately one-half of said inner blanket assemblies having been operated as inner blanket assemblies for one of said predetermined periods of reactor operation and approximately one-half of said inner blanket assemblies having been operated as inner blanket assemblies for two of said predetermined periods of reactor operation, and during refueling performing the following operations:

replacing with fresh blanket assemblies substantially all of said inner blanket assemblies which have been operated for one of said predetermined periods of reactor operation;

moving substantially all of said inner blanket assemblies which have been operated for one of said predetermined periods of reactor operation to replace substantially all of said inner blanket assemblies which have been operated for two of said predetermined periods of reactor operation;

moving substantially all of said inner blanket assemblies which have been operated as inner blanket assemblies for two of said predetermined periods of reactor operation to replace blanket assemblies in said inner radial blanket assembly row;

moving substantially all of said blanket assemblies which are replaced from said inner radial blanket assembly row to replace blanket assemblies in said outer radial blanket assembly row;

moving blanket assemblies which are replaced in said outer radial blanket assembly row to replace assemblies in said additional contiguous blanket assembly row; and repeating the foregoing blanket assembly movements in subsequent refuelings, whereby the substantial majority of said blanket assemblies are initially operated in inner blanket assembly positions for one of said predetermined periods of reactor operation and are subsequently operated in different inner blanket assembly positions for an additional one of said predetermined periods of reactor operation after which they are operated in inner radial blanket assembly positions for one of said predetermined periods of reactor operation after which they are operated in outer radial blanket assembly positions for one of said predetermined periods of reactor operation after which they are operated in positions in said additional outer assembly row for one of said predetermined periods of reactor operation.

13. The method as specified in claim 12, wherein substantially all of said inner blanket assemblies are alternately positioned so that at the termination of each of said predetermined periods of reactor operation and prior to refueling, an inner blanket assembly which has been operated for one of said predetermined periods of reactor operation is positioned next to an inner blanket assembly which has been operated for two of said predetermined periods of reactor operation.

14. The method as specified in claim 12, wherein each of said inner blanket assemblies has a predetermined rate of flow of cooling fluid therethrough during reactor operation, and those of said inner blanket assembly positions which are adapted to receive fresh blanket assemblies during refueling having a predetermined lesser rate of flow of cooling fluid therethrough than those of said inner blanket assembly positions which are adapted to receive blanket assemblies during refueling which have already been operated for one of said predetermined periods of reactor operation.

15. The method of moving blanket and fuel assemblies during refueling in a heterogeneous-type core for a liquid-metal-cooled fast-breeder nuclear reactor to improve the performance thereof, said core comprising a plurality of fissile-material-containing fuel assemblies and a plurality of fertile-material-containing blanket assemblies, said blanket assemblies including a plurality of inner blanket assemblies positioned in predetermined different locations within the interior of said core and radial blanket assemblies positioned proximate the periphery of said core, said inner blanket assemblies located proximate the center of said core and also positioned to form a plurality of separate blanket assembly rows which are radially spaced from one another and also from said radial blanket assemblies and are generally concentric with respect to the center of said core, said radial blanket assemblies comprising inner and outer contiguous rows of individual blanket assemblies positioned proximate the periphery of said core, said fuel assemblies comprising a plurality of separate fuel assembly rows positioned intermediate said spaced blanket assembly rows, and said reactor being periodically refueled at the termination of predetermined periods of reactor operation, said method comprising moving said blanket and fuel assemblies in accordance with the following schedule:

prior to blanket and fuel assembly movement during refueling, approximately one-half of said inner blanket assemblies having been operated as inner blanket assemblies for one of said predetermined periods of reactor operation and approximately one-half of said inner blanket assemblies having been operated as inner blanket assemblies for two of said predetermined periods of reactor operation, approximately one-half of said fuel assemblies having been operated for one of said predetermined periods of reactor operation and approximately one-half of said fuel assemblies having been operated for two of said predetermined periods of reactor operation, and during refueling performing the following operations:

replacing approximately one-half of all of said inner blanket assemblies with fresh blanket assemblies;

moving blanket assemblies which have been operated as inner blanket assemblies for one of said predetermined periods of reactor operation to replace substantially all of those of said inner blanket assemblies which are not replaced with fresh blanket assemblies;

replacing with fresh fuel assemblies those of said fuel assemblies which have been operated for two of said predetermined periods of reactor operation with substantially all of said fresh fuel assemblies positioned proximate those of said replaced blanket assemblies which have been operated for one of said predetermined periods of reactor operation to minimize the temperature gradients therebetween, and substantially all of said fuel assemblies which have been operated for one of said predetermined periods of reactor operation and are not replaced being positioned proximate said fresh inner blanket assemblies to minimize the temperature gradients therebetween;

moving substantially all of said inner blanket assemblies which have been operated as inner blanket assemblies for two of said predetermined periods of reactor operation to replace blanket assemblies in said inner radial blanket assembly row;

moving substantially all of said blanket assemblies which are replaced from said inner radial blanket assembly row to replace blanket assemblies in said outer radial blanket assembly row; and repeating the foregoing blanket and fuel assembly movements in subsequent refuelings.

* * * * *